United States Patent [19]  [11]  4,089,832
Yamauchi et al.  [45]  May 16, 1978

[54] WATER-CONTAINING PLASTIC COMPOSITION

[75] Inventors: Aizo Yamauchi, Atsugi; Yasushi Watanabe, Aikawa, both of Japan

[73] Assignee: Director-General of the Agency of Industrial Science & Technology, Tokyo, Japan

[21] Appl. No.: 506,834

[22] Filed: Sep. 17, 1974

[30] Foreign Application Priority Data

Sep. 18, 1973 Japan .............................. 48-105196
Sep. 18, 1973 Japan .............................. 48-105197

[51] Int. Cl.$^2$ ............................................. C08L 33/04
[52] U.S. Cl. ....................... 260/29.6 WA; 260/29.6 B; 260/29.6 RW; 260/29.6 H; 260/29.6 WQ
[58] Field of Search ................. 260/29.6 WA, 29.6 B, 260/29.6 RW, 29.6 H, 29.6 WQ, 886, 29.6 HN

[56] References Cited

U.S. PATENT DOCUMENTS

| | | |
|---|---|---|
| 2,658,045 | 11/1953 | Schildknecht ............... 260/29.6 HN |
| 2,908,659 | 10/1959 | Shashoua ..................... 260/29.6 HN |
| 3,354,084 | 11/1967 | Katzer .......................... 260/29.6 H |
| 3,461,052 | 8/1969 | Restaino et al. ............ 260/29.6 WA |
| 3,658,745 | 4/1972 | Merrill et al. ................. 260/29.6 B |
| 3,689,439 | 9/1972 | Field et al. ..................... 260/29.7 H |
| 3,692,724 | 9/1972 | VanDyk ...................... 260/29.6 WQ |
| 3,758,641 | 9/1973 | Zweigle ...................... 260/29.6 RW |

Primary Examiner—M. J. Welsh
Attorney, Agent, or Firm—William J. Daniel

[57] ABSTRACT

A water-containing plastic composition which comprises (a) 10–90 wt. % of water-containing powdery gel obtained by subjecting at least one water-soluble polymer such as polyvinyl alcohol, polyacrylamide, polyvinylpyrrolidone or poly(hydroxyalkyl acrylate), while it is in the state of an aqueous solution, to crosslinking reaction and then pulverizing the crosslinked product and (b) 90–10 wt. % of at least one plastic substance selected from thermoplastic and thermohardenable plastics. The water-containing plastic composition is suitable as a material for manufacturing poorly combustible molding materials.

11 Claims, No Drawings

WATER-CONTAINING PLASTIC COMPOSITION

BACKGROUND OF THE INVENTION

This invention relates to a water-containing plastic composition. More particularly, this invention relates to a composition which comprises a water-containing gel as a dispersed phase obtained by subjecting a water-soluble polymer while it is in the form of an aqueous solution, to crosslinking reaction and a variety of plastics as a matrix (or continuous phase).

In recent years, plastics have made remarkable inroads into the field of construction materials and are continuously increasing this tendency. Plastics owe their usefulness in this new field to their excellent properties such as light weight, excellent workability, beautiful appearance and heat-insulating properties. On the other hand, the readily combustible nature of such plastics is a drawback to increasing the proportion of plastics used in construction materials. Thus, studies are now being made of ways to render plastics poorly combustible. One suggested treatment for rendering plastics poorly combustible involves the incorporation of a halogen-containing or phosphorus-containing combustion-inhibiting agent which, on combustion, emits a toxic or harmful gas or the use of a poorly combustible plastic resin such as polyvinyl chloride which certainly exhibits poor inflammability but emits a toxic gas on combustion. As these toxic and harmful gases are seriously dangerous to the health of humans and animals, the question of whether or not a toxic or harmful gas evolves at the time of combustion an additional consideration which must be taken into account. Accordingly, there is a great demand in the field of construction materials for the development of a new type of plastic material which exhibits good combustion-resisting properties without the evolution of either toxic gas or harmful gas upon heating.

On the other hand, it is known that water can be dispersed into plastics to impart combustion-resisting property to them. Heretofore reported in the art are, for example, a process for forming water-containing plastics which comprises preparing a water-in-oil emulsion containing a monomer and then polymerizing the monomer in such state (Japanese Pat. Publn. No. 31771/Showa 47), a process wherein a water-in-oil emulsion containing an unsaturated polyester is molded under curing conditions in the presence of a catalyst (Japanese Pat. Publn. No. 12437/Showa 48), and a process wherein water-containing microcapsules are mixed with a thermocurable plastic substance and the mixture is molded under curing conditions (Japanese Patent Publn. No. 35694/Showa 48). However, these processes have not yet been perfected for practical use because of the complicated operations and special apparatus necessary to carry them out and the difficulty in homogeneously dispersing large amounts of water into plastics and still obtaining products with satisfactory strength.

BRIEF SUMMARY OF THE INVENTION

Accordingly, it is an object of the present invention to provide a water-containing plastic composition suitable for manufacturing molding materials with combustion-resisting properties.

It is another object of the present invention to provide a plastic molded article having a large amount of water dispersed thereinto.

It is a further object of the present invention to provide a water-containing powdery gel which is easily dispersible into plastics.

These and other objects, features and advantages of the present invention will appear more fully from the following description.

DETAILED DESCRIPTION OF THE INVENTION

It has now been found that a water-containing powdery gel obtained by subjecting an aqueous solution of a water-soluble polymer to crosslinking reaction and then pulverizing the crosslinked product is very stable and can thus be incorporated in a high proportion into any desired plastic material.

In accordance with this invention, the above-mentioned objects can be attained by using a water-containing plastic composition which comprises (a) 10–90 wt. % particles of a water-containing gel obtained by subjecting a water-soluble polymer while in aqueous solution to crosslinking reaction and then pulverizing the crosslinked product and (b) 90–10 wt. % of at least one plastic substance selected from thermoplastic and thermohardenable plastics.

Examples of the water-soluble polymer utilizable for the preparation of the water-containing gel include completely or partially saponified polyvinyl alcohol, polyacrylamide, polymethacrylamide, polyvinylpyrrolidone, poly(hydroxyalkyl acrylate) and poly(hydroxyalkyl methacrylate).

The water-containing gel used in this invention can easily be obtained, for example, by preparing an aqueous solution of the water-soluble polymer and then irradiating the aqueous solution with ionizing radiation such as $\gamma$-ray or electron beam or alternatively adding a crosslinking agent such as a divinyl compound and a polymerization initiator such as a persulfate or organic peroxide to the aqueous solution to cause crosslinking reaction of the polymer. The water-containing gel thus obtained is pulverized by a proper means such as a homogenizer to have an adequate particle size, for example, to have a particle diameter of 0.1–5 mm.

An especially advantageous method for preparing the water-containing powdery gel comprises dispersing an aqueous solution of the water-soluble polymer into a water-immiscible medium such as benzene, toluene or kerosene under agitation to form a water-in-oil emulsion and irradiating the emulsion with ionizing radiation. According to this method, the water-containing gel having a desired particle size can be obtained directly by proper selection of the dispersing condition. In this case, the particle size of the resulting water-containing gel particles depends chiefly on stirring rate (for example, the rotation speed of a mixer used), viscosity of the aqueous and oily phases, distribution rate of the aqueous phase and the oily phase, plus the presence or absence of a surfactant. Especially, the stirring rate and the viscosity are known to be important factors in determination of the particle size. Therefore, it is desirable to establish an optimum condition for obtaining the desirable particle diameter of the water-containing gel. The relation between these factors and the particle size is shown approximately by the following formula:

$$d_{av} \propto n^{-\alpha}(\nu_d/\nu_c)^{\beta\psi\gamma}$$

wherein $d_{av}$ stands for an average diameter of the dispersion phase, $n$ for stirring rate (rotation speed), $\nu_d$ for a ratio of the viscosity of the dispersed phase/the density of the dispersed phase, $v_c$ for a ratio of the viscosity of the continuous phase/the density of the continuous phase, and $\alpha$, $\beta$ and $\gamma$ for constants.

The ionizing radiation for initiating the crosslinking reaction of the water-containing gel may include γ-ray emitted from a radioactive source, for example, cobalt 60, and particle rays from a particle-accelerating apparatus such as a linear accelerator. However, the use of particle accelerating apparatus capable of emitting a large dose of rays within a short period of time is preferable for effecting a crosslinking reaction of the polymer to form a water-insoluble water-containing gel when the polymer is present in an aqueous phase dispersed within an oily phase as a water-in-oil emulsion. The total dose of radiation varies according to the concentration of a water-soluble polymer such as polyvinyl alcohol, but is generally such that it is sufficient enough to cause gellation of the polymer. Usually, the total dose is preferably at least $1 \times 10^6$ Roentgen, more preferably at least $6 \times 10^6$ Roentgen.

The water-containing gel thus prepared may be once dried and then swollen by water or a salt-containing solution just prior to actual use. This mode is advantageous in that water-soluble materials to be incorporated into the composition can be dispersed homogeneously into the composition.

Illustrative of plastics utilizable as the matrix of the composition of this invention are thermoplastic resins such as, polyethylene, polypropylene, poylstyrene, polyvinyl acetate, poly (acrylic esters), poly (methacrylic esters), polyvinyl chloride, polyamide, polyurethane and polyesters; and thermohardenable resins such as phenol resin, epoxy resin and unsaturated polyester.

The composition of this invention is manufactured by mixing the water-containing powder gel with a powdery thermoplastic plastic substance and then subjecting the mixture to compression molding under heat in the usual manner or by adding the water-containing powdery gel and a hardening agent to a liquid thermohardenable plastic material and heating the mixture to effect hardening of the plastic material, or by adding a polymerizable monomer and a polymerization initiator to the water-containing powdery gel and effecting polymerization and molding of the mixture at the same time. In the case of using a thermoplastic plastic substance such as polyethylene or polystyrene, a mixture of powders of such plastic substance and the water-containing powdery gel is subjected in a usual manner to injection molding or extrusion molding. In the case of using a thermohardenable plastic material such as epoxy resin, a mixture of the starting epoxy compound and the water-containing powdery gel is admixed with a hardener such as an amine, charged into a mold having a suitable shape and then hardened under heat. In the case of using a polymerizable monomer such as methyl methacrylate, a mixture of such monomer and the water-containing powdery gel is admixed with a radical polymerization initiator such as benzoyl peroxide and then polymerization and molding of the mixture are carried out at the same time.

In any case, the thermoplastic or thermohardenable resin forms, at the time of molding or during the simultaneous polymerization and molding, a continuous phase having dispersed thereinto the water-containing gel and is then solidified to form a matrix of the composition.

The ratio by weight of the water-containing gel to the plastic matrix resin ranges from 1:9 to 9:1. Compositions comprising the water-containing gel in amounts ranging from 30 to 60% by weight and the plastic resin in amounts ranging from 70 to 40% by weight are preferable. No particular limitation exists on the water content of the gel, but the ratio by weight of water to the water-soluble polymer is preferably about 1–10 : 1.

The composition of this invention may be incorporated with additives conventionally used for plastics, for example, antioxidants, plasticizers, coloring agents, fillers, modifiers, combustion-resisting agents and foaming agents. If such additives are water soluble, incorporation of the additives into the composition is preferably effected by making an aqueous solution of the additives, dipping a dried water-containing crosslinked product into the aqueous solution to swell the product therewith and then mixing the product with the plastic substance. Additives can be dispersed into the composition homogeneously in this manner.

The water-containing plastic composition thus obtained is extremely low in combustibility and shows water-releasing or water-absorbing activity (the so-called "respiratory action") according to the external circumstances. Thus, the composition of this invention is especially suitable for use in the field of construction.

This invention will be illustrated in more detail by way of Examples.

EXAMPLE 1

100 milliliters of an aqueous solution of 8 g of completely saponified polyvinyl alcohol having a mean polymerization degree of 2000 in 100 g of water were added to 400 ml of toluene and the mixture was stirred by a mixer (rotation speed : 140 rpm) to disperse the aqueous solution into the toluene. This dispersion was irradiated under agitation with electron beam (8.2 Mev, 45μA) from a linear accelerator for 5 minutes. After completion of the irradiation, the resulting crosslinked water-containing polyvinyl alcohol gel in the form of rice-like grains were separated. This product was insoluble in water. Yield : 64%; an average diameter of the gel particles : 4.8 mm.

EXAMPLE 2

Except that 400 ml of a 5% toluene solution of polystyrene were used in place of 400 ml of toluene, the treatment was carried out in a manner similar to that described in Example 1 to obtain a granular crosslinked water-containing polyvinyl alcohol gel. The 5% toluene solution of polystyrene had a viscosity of 40 cp.g/cm$^2$ when measured by a vibration viscometer. The yield of the resulting water-containing gel was 41% and an average particle diameter thereof was 0.75 mm.

EXAMPLE 3

Except that kerosene was used in place of toluene, the treatment was carried out in a manner similar to that described in Example 1 to obtain a granular crosslinked water-containing polyvinyl alcohol gel which was insoluble in hot water.

EXAMPLE 4

Except that about 100 g of ice for the purpose of cooling were used in addition to 100 ml of the aqueous solution of polyvinyl alcohol and 400 ml of toluene and the mixture was stirred by a mixer, the treatment was carried out in a manner similar to that described in Example 1 to obtain a crosslinked water-containing polyvinyl alcohol gel.

EXAMPLE 5

In a 100 ml Erlenmayer flask were placed 10 ml of a 7% aqueous solution of partially saponified polyvinyl alcohol having a mean polymerization degree of 1700. 50 milliliters of a 5% toluene solution of polystyrene were then added to the aqueous solution in the flask and the mixture was agitated by a magnetic stirrer. The mixture was irradiated under agitation with γ-ray from cobalt 60 until the irradiation dose equalled $1 \times 10^7$ Roentgen and a granular gel was produced. Rotation speed : 6 rpm; yield of the product : 15%; particle diameter of the product : 1.0 mm.

EXAMPLE 6

20 Grams of polyacrylamide and 20 g of purified acrylamide were dissolved in 360 g of water to form an aqueous solution which was then irradiated with γ-rays in a dose of 12.5 MR from cobalt 60 to form a water-containing gel.

The resulting gel was pulverized by a homogenizer, washed with warm water and then collected by filtration to obtain fine particles having a particle diameter of 0.5–1.0 mm. The product contained 127.5% of water.

90 Grams of the particulate water-containing gel thus obtained were thoroughly mixed by the aid of a blender with 110 g of powdery polystyrene. 153 Grams of the mixture were charged into a metal mold (160 × 160 × 5 mm), preliminarily heated for 2 minutes with a hot press kept at 210° C and then subjected to press molding under pressure of 200 kg/cm² (gauge). After lapse of 3 minutes, the metal mold was rapidly cooled while keeping the pressure and a molded product was taken out after complete cooling of the mold. If air-tightness of the metal mold is bad, a large amount of steam will evolve during the press molding operation to cause serious reduction of the water content of the molded product. Thus, care should be taken to this point. The resulting molded article in the form of a plate weighed 118.7 g and about 10 g of a flash were also formed.

The plate was then cut at an interval of 15 mm wide into strips (160 × 15 × 5 mm) by the aid of a cutter and the strips were used as test pieces for a bending test whereby the bending strength and the bending elasticity of the product were determined as 0.432 kg/mm² and 49.79 kg/mm², respectively. The test pieces were subjected to a combustion test according to the O.I. (oxygen index) method whereby the O.I. value of the test pieces was determined as 0.227.

EXAMPLE 7

250 Grams of a 10% aqueous solution of polyvinylpyrrolidone were irradiated for 20 minutes with electron beam of 7.5 MeV to obtain a water-containing gel. The irradiation dose of the electron beam during this treatment was about 12 MR in terms of γ-ray.

The product thus obtained was pulverized by a homogenizer, washed with warm water and then collected by filtration to obtain fine particles of the water-containing gel having a particle size of 1 mm or less. The water content of this product was 729%.

90 Grams of the water-containing gel thus obtained were thoroughly mixed with 110 g of polyethylene powder by the aid of a blender and 140 g of the resulting mixture were molded in a manner similar to that described in Example 5 using a press heated at 180° C. The resulting molded article in the form of a plate weighed 108.6 g and a flash weighed 2.4 g.

The molded article was subjected to a bending test conducted as described in Example 6 whereby the bending strength and the bending elasticity of the molded article were determined as 0.392 kg/mm² and 15.13 kg/mm², respectively. The O.I. value of this article was determined as 0.228.

EXAMPLE 8

10 Grams of purified acrylamide and 0.5 g of methylene-bis-acrylamide were dissolved in distilled water to make the total amount of the solution to 100 g. To this solution were added 0.5 g of dimethylaminopropionitrile and 10 ml of a 6% aqueous solution of ammonium persulfate as polymerization catalysts. The mixture was vigorously stirred and allowed to stand for 10 hours at room temperature whereby the solution was entirely gelled to form a water-containing gel.

The gel thus obtained was pulverized by the aid of a homogenizer to form fine particles having a diameter of 1mm or less and then washed well with water.

The resulting fine particles of the water-containing gel was mixed with polyethylene powder in a weight ratio of 45:55 and 153 g of the mixture were molded as described in Example 5. The resulting molded article in the form of a plate weighed 117 g and showed in a bending test a bending strength of 0.442 kg/mm² and a bending elasticity of 50.63 kg/mm². The O.I. value of this article was 0.226.

EXAMPLE 9

20 Grams of hydroxyethyl methacrylate were dissolved in 80 g of water and the aqueous solution was irradiated with γ-rays from cobalt 60 in an irradiation dose of 6 MR to obtain a water-containing gel which was then pulverized to form particles having an average diameter of about 0.2 mm by the aid of a homogenizer.

Except that hydroxyethyl acrylate was used in the same amount in place of hydroxyethyl methacrylate, the treatment was carried out as described above to form a water-containing gel possessing almost identical properties. The resulting water-containing gel was mixed with polystyrene in a weight ratio of 50:50 and 155 g of the mixture were subjected to press molding in a manner similar to that described in Example 5. The shaped article thus obtained weighed 120 g and showed in a bending test a bending strength of 0.523 kg/mm² and a bending elasticity of 61.4 kg/mm². The O.I. value of the article was 0.23.

In the case of using poly(hydroxyethyl acrylate), the bending strength and the bending elasticity of the resulting molded article were 0.511 kg/mm² and 58.5 kg/mm², respectively. The O.I. value of the article was 0.224.

EXAMPLE 10

In a glass vessel were placed 200 g of a 7% aqueous solution of completely saponified polyvinyl alcohol having a mean polymerization degree of 2000. After replacing the air in the glass vessel with nitrogen, the vessel was tightly sealed with a stopper and the solution was irradiated wih γ-rays from cobalt 60 in an irradiation dose of $1 \times 10^7$ Roentgen to form a water-containing gel which showed an equilibrium swelling rate of 619% to water (30° C). The gel was pulverized by a homogenizer to form a powdery gel having an average diameter of about 0.3 mm, separated by filtration from water and mixed with polystyrene powder. About 25 g of the mixture were charged into a metal mold in the form of a plate (80 mm × 80 mm × 3 mm) and molded by means of a press heated at 200° C under pressure of 200 kg/cm² (gauge). In this test, the water-containing gel was mixed to give an amount of 30%, 50% or 80% by weight with the polystyrene powder. The press molding under heat was effected for 3 minutes and then the press was cooled rapidly. After cooling the press to room temperature, the molded article was released from the metal mold, which was a composite material comprising a polystyrene plate having dispersed thereinto fine particles of the water-containing gel.

The composite material thus obtained was cut into test pieces (80 mm × 10 mm × 3 mm) which were then subjected to a bending test and a moisture-releasing and moisture-absorbing test. The results of these tests are shown in Table 1 below.

Table 1

| | | | |
|---|---|---|---|
| Quantity of the water-containing gel mixed (wt.%) | 30 | 50 | 80 |
| Rate of releasing water when the gel is left at room temperature (%) (after 10 days) | 12.4 | 28.2 | 56.0 |
| Rate of absorbing water when the dehydrated gel (referred to above) is dipped into water (30° C) (%) | 122 | 154 | 225 |
| Bending strength (kg/mm²) of the gel left at room temperature | 2.43 | 1.72 | — |
| Bending elasticity (kg/mm²) of the gel left at room temperature | | | |

EXAMPLE 11

Partially saponified polyvinyl alcohol powder having a mean polymerization degree of 1700 was dipped for 2 days into a saturated aqueous solution of sodium sulfate (30° C). The aqueous solution was then irradiated under agitation by a mixer with an electron beam (8MeV) from a linear accelerator in an irradiation dose equivalent to $1 \times 10^7$ Roentgen and the resulting gel was separated and washed thoroughly with hot water. The resulting water-containing powder gel was mixed with polystyrene powder and the mixture was press molded according to the method described in Example 10 to obtain a composite material. The swelling rate of the water-containing gel was 815%. The water-containing gel was mixed in an amount of 15%, 30%, 45% and 60% by weight and the composite materials derived therefrom were cut into test pieces in a manner similar to that described in Example 10. A bending test was conducted using these test pieces. In addition, the change in weight of the test pieces was measured after water-releasing and water-absorbing test conducted for the test pieces just after cutting under the respective conditions of (a) being dipped in water, (b) being left in the air of RH 30% and (c) being dried with silica gel, and the combustibility of the test pieces according to the O.I. method were also determined. The results of these tests are shown in Table 2.

Table 2

| | | | | |
|---|---|---|---|---|
| Quantity of the water-containing gel mixed (wt. %) | 15 | 30 | 45 | 60 |
| Bending strength (kg/mm²) | 3.43 | 1.89 | 1.16 | 0.551 |
| Bending elasticity (kg/mm²) | 243 | 165 | 96.4 | 54.6 |
| Change in weight of the test piece dipped into water (30° C for 3 days) | 102 | 102 | 103 | 105 |
| Change in weight of the test piece left in the air of 65% RH (30° C for 3 days) | 99.1 | 98.4 | 96.7 | 89.8 |
| Change in weight of the test piece dried with silica gel (30° C for 3 days) | 97.7 | 93.6 | 82.6 | 66.2 |
| Combustibility (O.I. value) | 0.19 | — | 0.20 | 0.22 |

EXAMPLE 12

Using the same water-containing gel as described in Example 10 and polyethylene or polypropylene powder as plastic substance, a composite material was manufactured under the molding conditions as described in Example 10. The swelling rate of the water-containing gel used in this test was 662%.

The combustibility of the test pieces was determined according to the O.I. method and the values obtained were compared with those obtained for similar test pieces free of the water-containing gel. The results are shown in Table 3.

Table 3

| Plastic substance | Polyethylene | | Polypropylene | |
|---|---|---|---|---|
| Proportion of the water-containing gel (wt. %) | 0 | 45 | 0 | 45 |
| O.I. value | 0.189 | 0.237 | 0.180 | 0.215 |

EXAMPLE 13

40 Grams of the same water-containing gel (swelling rate: 662%) as described in Example 11 were placed in a three-necked flask and the air pressure in the flask was reduced by a pump. To the gel were added dropwise with stirring under sufficiently reduced pressure 60 g of methyl methacrylate containing 2% of a polymerization initiator from a dropping funnel. The mixture was cast into a metal mold (80 mm × 80 mm × 3 mm) with care being taken to prevent the formation of any bubbles in the mixture. Using a hot press, the mold was kept at 50° C for 24 hours under pressure of 100 kg/cm² (gauge), then kept at 80° C for 2 hours under pressure of 200 kg/cm² and finally cooled to room temperature. A molded composite material was removed, cut into test pieces (80 mm × 10 mm × 3 mm) and tested to determined its combustibility according to the O.I. method, whereby an O.I. value of 0.241 was obtained for the test pieces.

EXAMPLE 14

To a 7% aqueous solution of polyvinyl alcohol having a mean polymerization degree of 2000 were added glyoxal in an amount of 5% by weight based on the aqueous solution and a small amount of hydrochloric acid as catalyst. The mixture was allowed to stand for 2 days at 60° C and the resulting water-containing gel was thoroughly washed with water and pulverized by a homogenizer to prepare a sample of the water-containing gel. The sample was then mixed with polystyrene powder and worked up to a composite material according to a molding method similar to that described in Example 9. The composite material comprised 45% by weight of the water-containing gel and 55% by weight of polystyrene. According to the method described in Example 10, this product was cut into test pieces and tested by the O.I. method to determine the combustibility of the product in comparison with a similar sample of polystyrene free of the water-containing gel. This comparative test revealed that the O.I. value of the sample containing the water-containing gel was 0.215, whereas that of a polystyrene sample was 0.202.

EXAMPLE 15

An 8% aqueous solution of polyvinyl alcohol having a mean polymerization degree of 2000 was agitated in a mixer together with toluene and a 5% toluene solution of polystyrene and irradiated under agitation with electron beams (8.2 MeV) from a linear accelerator in an irradiation dose equivalent to $4 \times 10^6$ Roentgen. The granular water-containing gel thus obtained was mixed, directly or after being dried and swollen in a 10% aqueous solution of ammonium polyphosphate, with polystyrene powder and the mixture was worked up to a composite material according to the molding method described in Example 10. The composite material was cut into test pieces and tested to determine its combustibility by the O.I. method in accordance with the procedure described in Example 10. The composition and the O.I. values of the composite material were as shown in Table 4 below

Table 4

| | | | | |
|---|---|---|---|---|
| Swelling rate of the water-containing gel (%) | 522 | 783 | 844 | 619 |
| Average diameter of the water-containing gel (mm) | 1.0 | 7.0 | 2.3 | 0.75 |
| Content of the water-containing gel (%) | 45 | 45 | 45 | 45 |
| Presence or absence of ammonium polyphosphate | Presence | Absence | Absence | Absence |
| O.I. value | 0.237 | 0.224 | 0.224 | 0.237 |

We claim:

1. A method of making a solid water-containing plastic compositon which comprises mixing about 10–90 wt. % of particles of
   a gel of a cross-linked, water-soluble polymer of an $\alpha,\beta$-ethylenically unsaturated monomer having water entrained therein in a weight ratio of about 1-10:1 relative to such polymer, with about 90-10 wt. % of a thermoplastic or thermohardenable plastic in fluent form, molding said mixture to a desired shape, and hardening said plastic while the mixture retains said shape.

2. A method of making a solid water-containing plastic composition which comprises mixing about 10–90 wt. % of particles of
   a gel of a cross-linked, water-soluble polymer of an $\alpha,\beta$-ethylenically unsaturated monomer having water entrained therein in a weight ratio of about 1-10:1 relative to such polymer, with about 90–10wt. % of a polymerizable vinyl monomer, molding said mixture to a desired shape, and initiating polymerization of said monomer while the mixture retains said shape.

3. A method of preparing particles of a water-containing polymer gel which comprises forming an aqueous solution of a water-soluble polymer of an $\alpha,\beta$-ethylenically unsaturated monomer in a weight ratio of water to polymer of about 1-10:1, emulsifying said aqueous polymer solution in a water-immiscible medium, and while the aqueous polymer solution is so emulsified subjecting the same to a cross-linking to gel the same.

4. A method of preparing particles of a water-containing gel which comprises forming an aqueous solution of a water-soluble polymer of an $\alpha,\beta$-ethylenically unsaturated monomer in a weight ratio of water to polymer of about 1-10:1, subjecting a body of the resultant polymer solution to a cross-linking reaction to gel the same, and then pulverizing the thus formed gel into particles.

5. A solid water-containing plastic composition comprising a solid matrix of about 10–90 wt. % of a thermoplastic or thermohardenable plastic, and uniformly distributed through said matrix about 90–10 wt. % of particles of the composite consisting essentially of a gel of a cross-linked normally water-soluble polymer of an $\alpha,\beta$-ethylenically unsaturated monomer having water entrained therein in a weight ratio of about 1-10:1 with respect to such polymer and having a particle size of about 0.1–5 mm.

6. A composition according to claim 5 wherein said water-soluble polymer is at least partially saponified polyvinyl alcohol and said matrix plastic is a styrene polymer.

7. A composition according to claim 5 wherein said water-soluble polymer is at least one selected from the group consisting of at least partially saponified polyvinyl alcohol, polyacrylamide, polymethacrylamide, polyvinylpyrrolidone, poly(hydroxyalkyl acrylate) and poly(hydroxyalkyl methacrylate).

8. A composition according to claim 5 wherein said plastic substance is at least one selected from the group consisting of polyethylene, polypropylene, polystyrene and poly(methyl methacrylate).

9. A composition according to claim 5 wherein said water-containing gel is prepared by dispersing an aqueous solution of a water-soluble polymer into a water-immiscible medium and irradiating the dispersion with an ionizing ray.

10. A composition according to claim 9 wherein said aqueous solution of a water-soluble polymer is an aqueous solution of polyvinyl alcohol.

11. A composition according to claim 9 wherein said water-immiscible medium is toluene or kerosene.

* * * * *